(12) United States Patent
Schulz (10) Patent No.: US 10,027,203 B2
(45) Date of Patent: Jul. 17, 2018

(54) ELECTRIC MOTOR COMPRISING A THERMAL FUSE

(71) Applicant: Brose Fahrzeugteile GmbH & Co. Kommanditgesellschaft, Wuerzburg, Wuerzburg (DE)

(72) Inventor: Janik Schulz, Wuerzburg (DE)

(73) Assignee: Brose Fahrzuegteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 15/375,740

(22) Filed: Dec. 12, 2016

(65) Prior Publication Data

US 2017/0093254 A1 Mar. 30, 2017

Related U.S. Application Data

(63) Continuation of application No. PCT/EP2015/063136, filed on Jun. 12, 2015.

(30) Foreign Application Priority Data

Jun. 12, 2014 (DE) .................... 20 2014 004 732 U (51) Int. Cl.
*H02K 1/27* (2006.01)
*H02K 11/25* (2016.01)
(Continued)

(52) U.S. Cl.
CPC .......... *H02K 11/25* (2016.01); *H01H 85/0241* (2013.01); *H01H 85/36* (2013.01);
(Continued)

(58) Field of Classification Search
CPC .......... H02K 11/25; H02K 11/33; H02K 1/27; H02K 7/14; H01H 85/0241; H01H 85/36; H02P 6/16; H02P 27/06
(Continued)

(56) References Cited

U.S. PATENT DOCUMENTS 8,633,621 B2   1/2014   Muhl et al.
2002/0041476 A1   4/2002   Petris
(Continued)

FOREIGN PATENT DOCUMENTS

DE   10 2009 036 578 B3   9/2010
DE   20 2010 002 664 U1   7/2011
FR         2 972 863 A1   9/2012

*Primary Examiner* — Terrance Kenerly
(74) *Attorney, Agent, or Firm* — Muncy, Geissler, Olds & Lowe, P.C.

(57) ABSTRACT

An electric motor for driving a motor vehicle component, in particular a fan impeller for cooling cooling water, having an electronics unit that includes a lead frame around which injection-molded plastic is provided and which has a current path conducting the motor current, and having two spaced-apart current path ends that form an interruption point bridged by a thermal fuse in the form of a spring-biased contact bridge. The contact bridge is mounted so as to be pivotable about an axis of rotation extending perpendicular to the plane of the interruption point. An abutment contour, against which the contact bridge pivots as a result of the restoring force of a spring element when the thermal fuse is triggered, limits the pivoting range of the contact bridge.

10 Claims, 4 Drawing Sheets

(51) Int. Cl.
*H02K 7/14* (2006.01)
*H01H 85/02* (2006.01)
*H01H 85/36* (2006.01)
*H02K 11/33* (2016.01)
*H02P 6/16* (2016.01)
*H02P 27/06* (2006.01)

(52) U.S. Cl.
CPC ............... *H02K 1/27* (2013.01); *H02K 7/14* (2013.01); *H02K 11/33* (2016.01); *H02P 6/16* (2013.01); *H02P 27/06* (2013.01)

(58) Field of Classification Search
USPC ....................................................... 310/68 C
See application file for complete search history.

(56) References Cited

U.S. PATENT DOCUMENTS

2002/0093259 A1* 7/2002 Sunaga ................ H05K 1/0201
310/68 R
2008/0117016 A1   5/2008 Yu
2010/0290168 A1* 11/2010 Wang ........................ H01T 1/14
361/104

* cited by examiner

ELECTRIC MOTOR COMPRISING A THERMAL FUSE

This nonprovisional application is a continuation of International Application No. PCT/EP2015/063136, which was filed on Jun. 12, 2015, and which claims priority to German Patent Application No. 20 2014 004 732.4, which was filed in Germany on Jun. 12, 2014, and which are both herein incorporated by reference.

BACKGROUND OF THE INVENTION

Field of the Invention

The invention relates to an especially brushless electric motor for driving a motor vehicle component, comprising an electronics unit that includes a lead frame, which is provided with plastic encapsulation and has a current path conducting the motor current, and having two spaced-apart current path ends that form an interruption point bridged by a thermal fuse in the form of a spring-biased contact bridge. A motor vehicle component is understood to be in particular a fan impeller for cooling the cooling water.

Description of the Background Art

DE 20 2010 002 664 U1, which corresponds to U.S. Pat. No. 8,633,621, which is incorporated herein by reference, and which discloses a DC motor for driving a motor vehicle component, in particular a fan impeller for cooling the cooling water, with a rotor and a commutator, against which carbon brushes rest in a contacting manner. A plastic-encapsulated lead frame forms a current path which is embossed in an electrical insulation and is connected in an electrically conductive manner to one of the carbon brushes. The current path, which conducts the motor current, is interrupted with the formation of two spaced-apart current path ends and the interruption point is bridged by a contact spring as the thermal fuse.

DE 10 2009 036 578 B3 relates to a thermal fuse, in particular for a power module of a motor vehicle, with a conductive strip, which is arranged on a circuit board and is interrupted by an interruption point, and which has a first conductive strip section and a second conductive strip section adjacent to the interruption point. A contact bridge, which is arranged in the area of the interruption point, has a first contact section and a second contact section arranged opposite to one another. The contact sections in a first position are attached to conductive strip sections by solder at soldering sites. The contact bridge in the first contact position is acted upon by a spring force in such a way that, when the melting point of the solder is reached, the contact sections of the corresponding conductive strip sections are separated. Further, the thermal fuse has a spring element which, when the melting point of the solder is reached, brings about a movement of the contact bridge, which extends parallel to the circuit board. In the second or triggering position, the contact bridge is held in a cage without contacting the first conductive strip section.

DE 10 2009 036 578 B3 discloses a thermal fuse with a spring-biased contact bridge, whose triggering movement in the event of triggering is oriented parallel to a circuit board, on which conductive strip sections run which are adjacent to a separation site and with which the contact bridge is contacted by means of solder melting in the event of triggering.

SUMMARY OF THE INVENTION

It is therefore an object of the invention is to provide an especially brushless electric motor for driving a motor vehicle component, in particular a fan impeller for cooling the cooling water, with a space-saving and reliably triggering thermal fuse.

To this end, the electric motor has in an exemplary embodiment, in addition to a rotor mounted so as to be rotatable relative to a stator, an electronics unit that includes a lead frame, which is provided with plastic encapsulation and has a current path conducting the motor current, and two spaced-apart current path ends, forming an interruption point, and a thermal fuse with a spring-biased contact bridge for the interruption point. The contact bridge, which has contact surfaces corresponding to the current path ends, is mounted so as to be pivotable about an axis, which extends perpendicular to the plane in which the interruption point is located. An abutment contour limiting the pivoting range of the contact bridge is used as a stop for the contact bridge when the thermal fuse is triggered.

In the case of triggering, the contact bridge pivots in the plane of the interruption point. As a result, a space-saving configuration option for the thermal fuse including the contact bridge and the spring element is made possible.

The abutment contour, acting as an end stop for the contact bridge when the thermal fuse is triggered, is suitably formed from the plastic encapsulation. Advantageously the contact bridge moreover is arranged overall in a circle segment-like guide slot formed from the plastic encapsulation. The interruption point is arranged along one of the circle radii and the abutment contour in the area of the other circle radius of the circle segment-like guide slot.

The circle segment shape of the guide slot makes it possible in a simple and reliable manner to limit the pivoting range of the contact bridge at at least one of the circle radii and to guide the contact bridge expediently also along an arcuate web contour of the guide slot. To this end, the contact bridge, suitably formed as or in the manner of a stamped/bent part, has a number of bent sections, which form a raised bridge section between the contact surfaces. As a result, the desired mechanical and/or electrical properties of the contact bridge can be established in a simple way. In particular, the contact bridge can be adapted to different current strengths.

The contact bridge has a free bridge end and a holding end opposite to it. The contact bridge sits with this end on a pivot pin, which is suitably formed from the plastic encapsulation and forms the rotation axis and which passes through a corresponding opening in the holding end of the contact bridge. In the area of the free bridge end there is a first contact surface, which in the normal state when the thermal fuse is not triggered is soldered to one of the current path ends. A second contact surface, which is in contact with the other current path end and can also be soldered to it, is located advantageously between the first contact surface and the rotation axis on the interruption point side facing it.

The spring element is formed particularly preferably as a leg spring with a spring eye and two spring legs. The spring eye in the assembled state coaxially surrounds the rotation axis, in particular the pivot pin. Thereby, in a simple and reliable manner there is a mutual pivoting of the spring element or its spring legs, acting jointly with the contact bridge, and of the contact bridge about the same rotation or pivot axis.

One of the spring legs of the leg spring is held on a stop-side extension arm and there suitably in an undercut contour, whereas the other spring leg lies under spring bias against the contact bridge on its long bridge side facing away from the stop contour. There, the contact bridge expediently has extensions, which extend in the pivot direction and are gripped above and below by the bridge-side spring leg.

When the thermal fuse is triggered, the spring element exerts furthermore a spring force on the contact bridge in the direction of the abutment contour. As a result, it is assured especially reliably that neither the contact bridge nor the spring element becomes detached from their fixation point in the area of the rotation axis. The spring legs of the spring element in this regard in the original state run spread at a suitable angle to one another in such a way that both in the bridged installed state and in the triggered state of the contact bridge the spring legs preferably run at an acute angle to one another and therefore a sufficient spring force always acts on the contact bridge. Suitably, the spring element is made of round wire. Therefore, this provides a cost-effective option for producing the spring element.

The contact bridge, suitably made as or in the manner of a stamped/bent part with a number of bent sections, forms a raised bridge section in the area of the rotation axis and between the contact surfaces. In addition, the contact bridge preferably has a bent depression, which is directed toward the contact surface facing the rotation axis. Because said contact surface of the rotation axis is placed radially upstream in the direction of the interruption point, only one correspondingly shortened radial bridge section of the contact bridge carries current.

When the thermal fuse is triggered, i.e., in the case of overheating, the solder melts in the area of the or each current path end, so that the contact bridge in the triggered case can pivot unimpeded about the rotation axis and in the plane of the interruption point. The melted solder connections are thereby practically protected, which assures a reliable interruption of the interruption point or contact point bridged by the thermal fuse or its contact bridge.

The advantages associated with the invention incle, in particular in that by triggering the thermal fuse in the plane of the interruption point a simple, advantageous, and space-saving option is provided for integrating the thermal fuse in an electric motor preferably constructed with the saving of space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
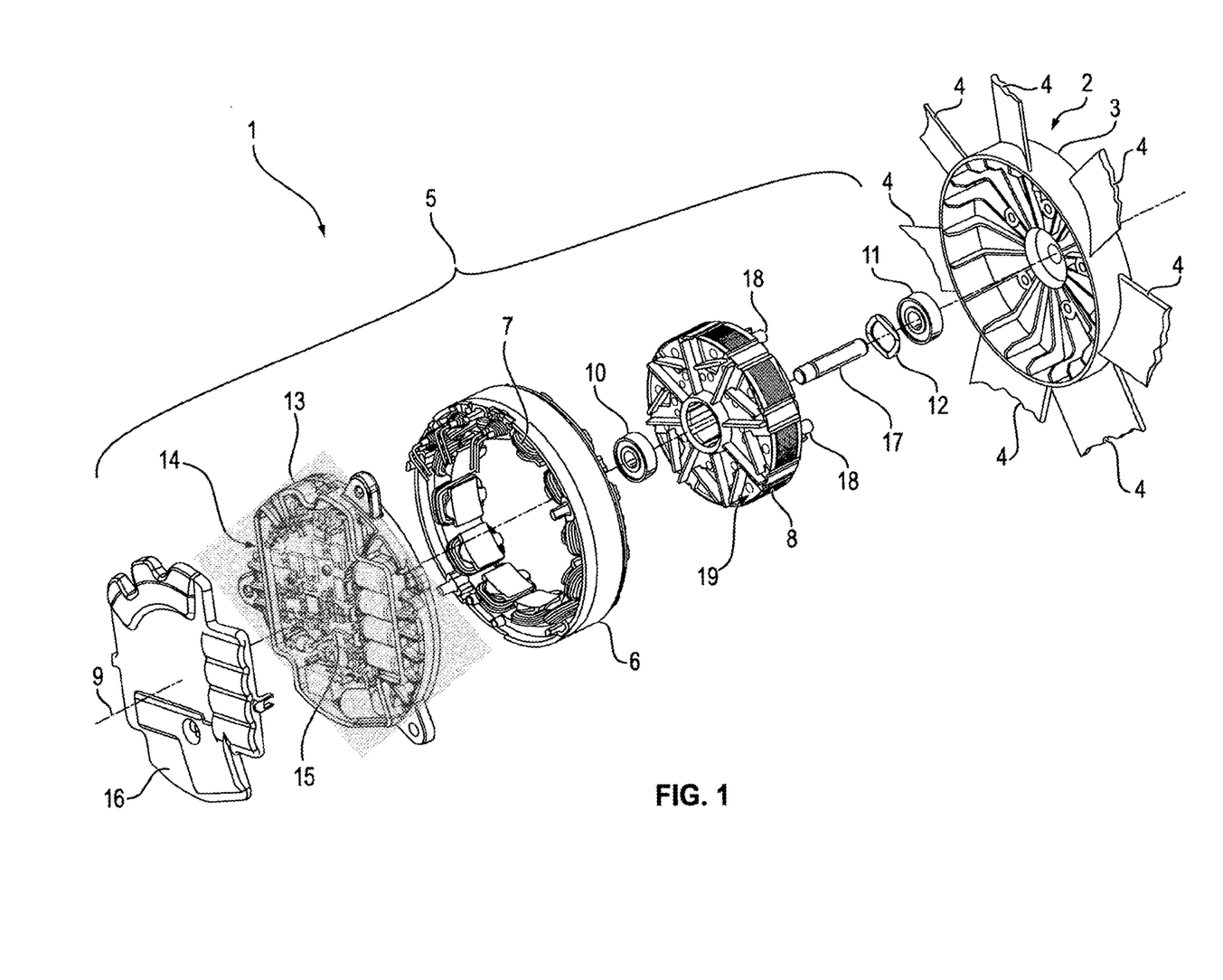
FIG. 1 shows in an exploded illustration a radiator fan for a motor vehicle with a brushless inner rotor motor with integrated inverter electronics.

FIG. 1 shows a fan 1 for the radiator of a motor vehicle in an exploded illustration. Fan 1 comprises a fan impeller 2 with a central cap 3, around whose outer circumference (only shown to some extent) air guide blades 4 are arranged evenly distributed. Fan 1 comprises furthermore an electric motor 5 which is also referred to as a fan motor and by which fan impeller 2 is rotationally driven.

Electric motor 5 is formed substantially by a stator 6, which is wound with a three-phase rotating field winding 7 in the form of coils. Motor 5 comprises furthermore a permanently excited rotor 8, which is mounted so as to be rotatable about a motor axis 9 in the interior of stator 6. To mount rotor 8, motor 5 comprises two roller bearings 10 and 11, which engage from axially opposite sides in rotor 8. The axial play of rotor 8 between the two roller bearings 10 and 11 is spring-biased in this case by a spring ring 12.

Motor 5 comprises furthermore an approximately disc- or half-shell-shaped motor support 13. At an end face facing away from fan impeller 2, an electronics compartment 14, into which inverter electronics 15 is inserted, is introduced into motor support 13. To tightly close electronics compartment 14, motor 5 comprises an electronics compartment cover 16 referred to as a housing cover hereafter.

Rotor 8 is formed by a lamination stack (not shown in greater detail), in which permanent magnets are inserted to generate an excitation field, whereby the lamination stack together with the inserted permanent magnets are encapsulated by a plastic sheath. In a similar way, stator 6 also has a lamination stack, which is encapsulated by a plastic sheath.

Motor support 13 is formed in particular by a one-piece die cast part made of aluminum. Electronics compartment cover 16 preferably is an injection-molded part made of plastic.

On its front side, rotor 8 is provided with four screw domes 18, by means of which rotor 8 in the assembled state is screwed onto fan impeller 2. Motor 5 and thereby the entire fan 1 is attached to the vehicle via motor support 13, which is provided for this purpose with three screw plates 19, protruding from its outer circumference. Motor 5 is a brushless, self-cooled inner rotor motor.

Figure 2:
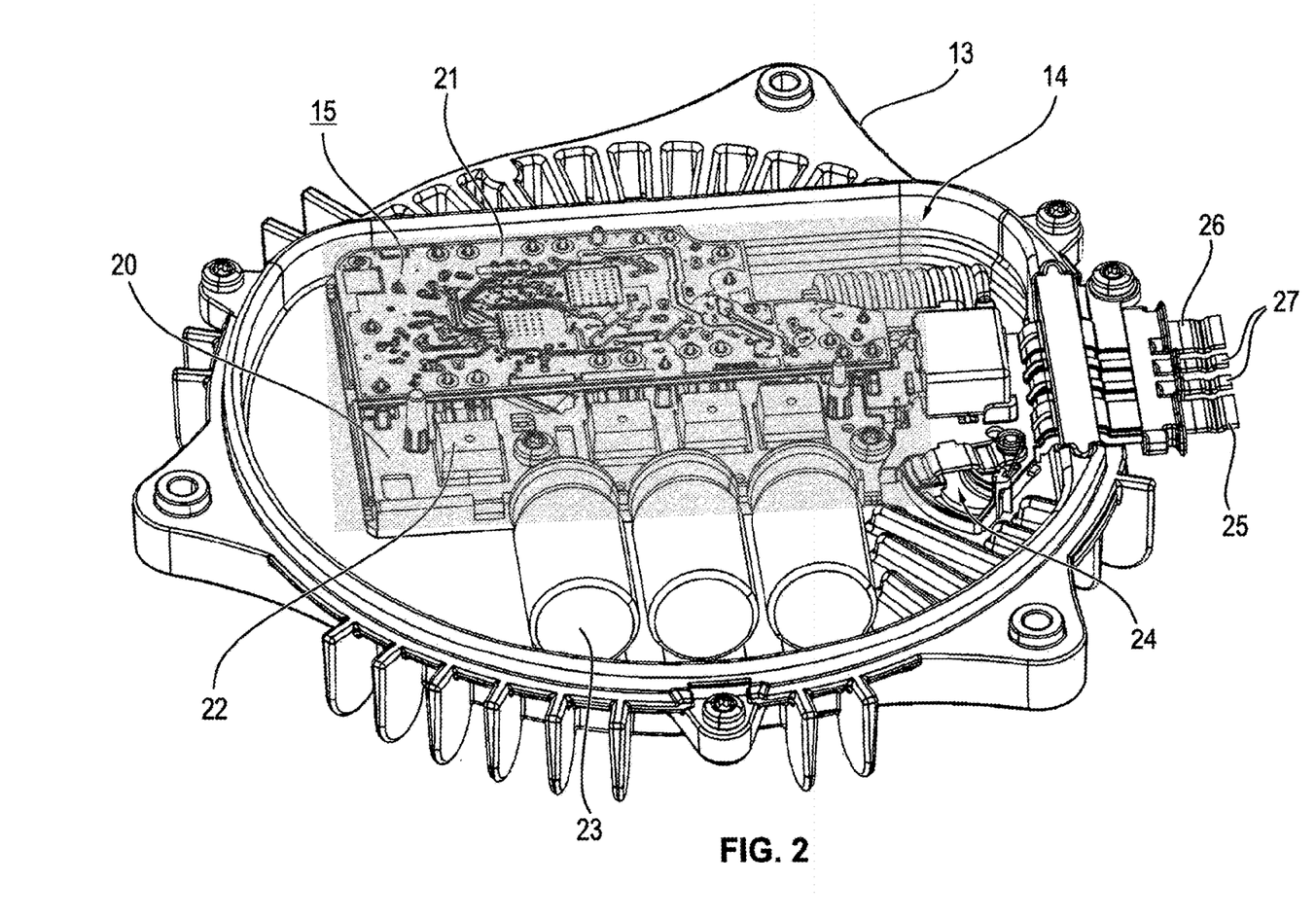
FIG. 2 shows an electronics compartment with an electronics unit of the electric motor, with a printed circuit board populated with electrical or electronic components, and with a lead frame provided with plastic encapsulation, and with a thermal fuse.

In FIG. 2, a perspective illustration shows a slightly modified motor support 13 with electronics unit 15 which is inserted into the corresponding electronics compartment 14 and, in contrast to the embodiment according to FIG. 1, for example, is assigned only three capacitors. Electronics unit 15 comprises a plastic-encapsulated lead frame 20 and a circuit board or printed circuit board 21 populated with electrical components. Electric motor 5 is driven by a bridge circuit (B6 circuit), which is implemented in the encapsulated lead frame 20. To this end, encapsulated lead frame 20 has a number of switchable semiconductor elements 22, by means of which three phase windings of field winding 7 of electric motor 5 are alternately supplied with current. The electrical current used for this purpose is provided by a DC source which is not shown in a more detailed manner.

The three phase windings of field winding 7 of electric motor 5 are connected, e.g., in a delta circuit via capacitors 23. In other words, two electrically adjacent phase windings are electrically connected at a motor-side contact point, and the windings in turn are electrically contacted via a bridge-side contact point in each case with a bridge branch of the bridge circuit. The windings are produced from enameled copper wire and rolled centrally to form a coil.

A thermal fuse 24 can be seen in FIG. 2 in addition to encapsulated lead frame 20 and semiconductor elements 22 and capacitors 23. Thermal fuse 24 protects electric motor 5 from overheating and the risk of fire. If motor 5 overheats, thus thermal fuse 24 is triggered and current can no longer flow to or from motor 5. Terminals 25, 26, and 27 form an input terminal and an output terminal for the motor current or two sensor signal outputs, e.g., for measurements of the rotational speed (number of revolutions), the rotation direction, and/or the position of motor 5.

Figure 3:
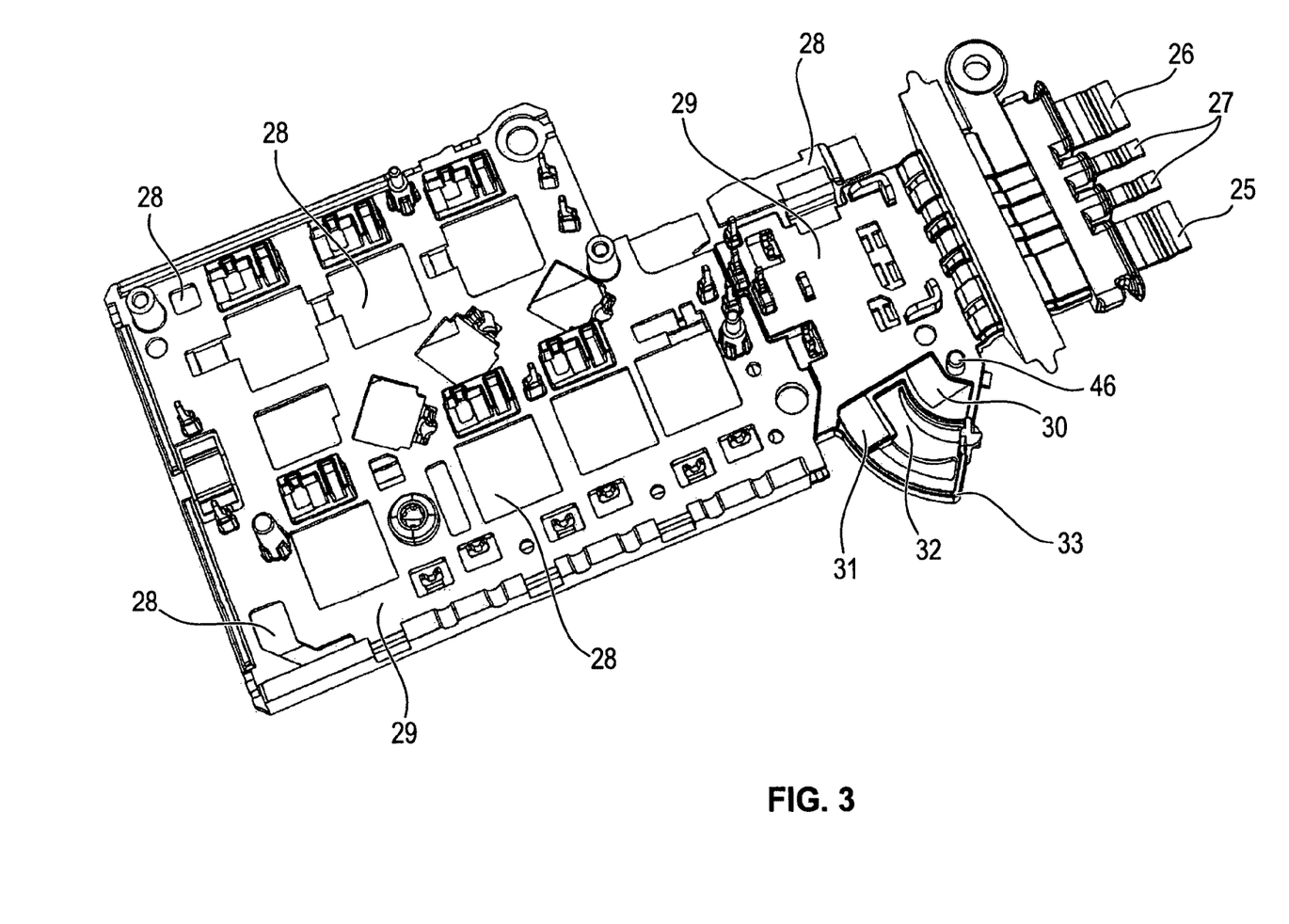
FIG. 3 shows the lead frame with the plastic encapsulation including an interruption point to be bridged by the thermal fuse in a perspective illustration.

As is evident relatively clearly from FIG. 3, lead frame 28, which realizes the traces and which or the traces of which conduct the motor current, is provided by a plastic encapsulation 29 and electrically insulated. In the area of the thermal fuse removed here, current path ends 30, 31 can be seen, which conduct the motor current and between which an interruption point 32 is formed in lead frame 28. Current path ends 30, 31 and interruption point 32 are located in guide slot 33, which is formed from plastic encapsulation 29 and which is configured in the shape of a circle segment at least on the inside.

Figure 4:
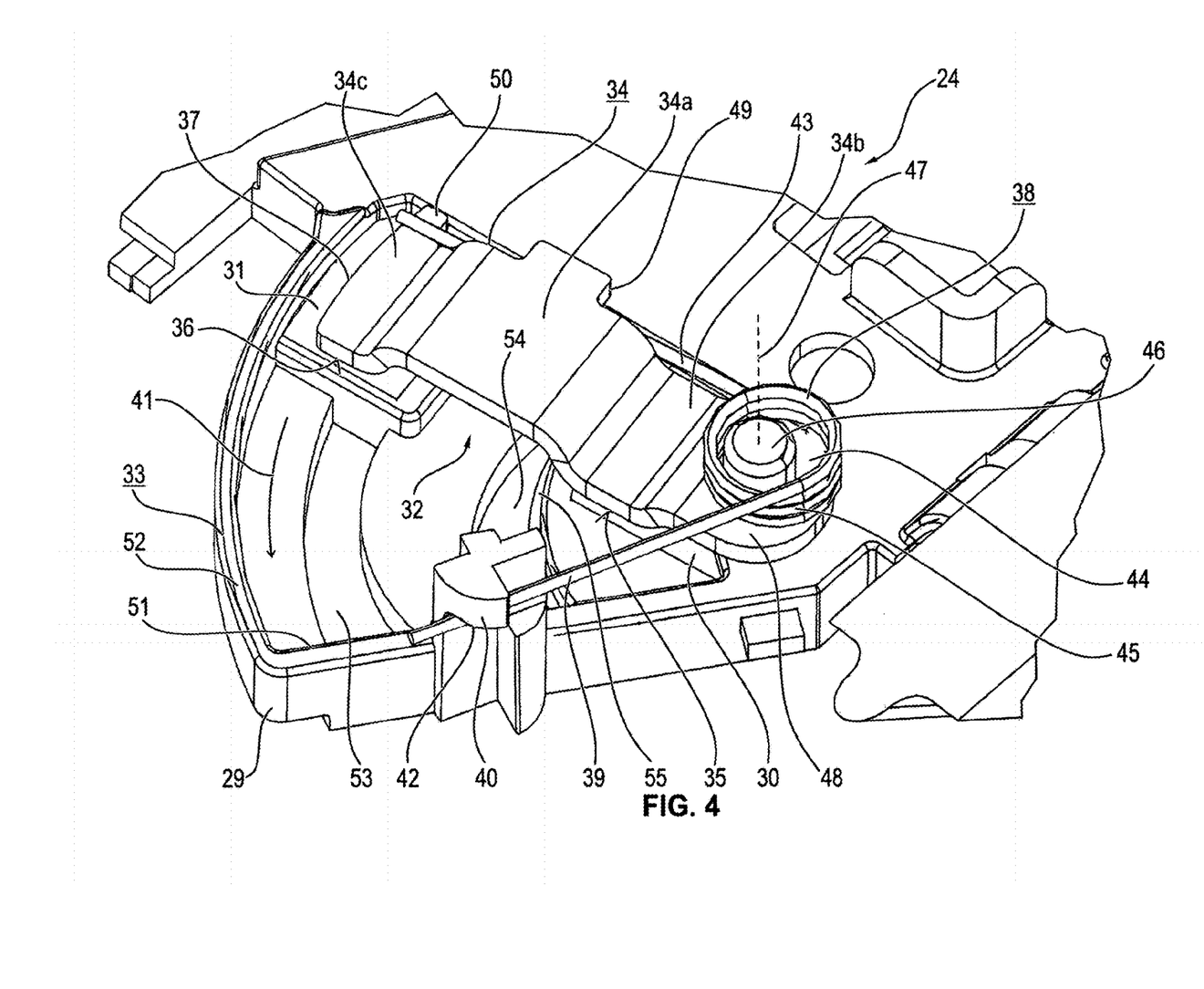
FIG. 4 shows in a detail in a perspective illustration the thermal fuse with a spring-biased contact bridge in the contact position within a guide slot with an abutment contour as the end stop for the contact bridge in the case of thermal fuse triggering.

As is evident relatively clearly from FIG. 4, thermal fuse 24 is formed from a contact bridge 34, which in the bridged state connects current path ends 30 and 31 of lead frame 28. Contact bridge 34 has contact surfaces 35 and 36, of which at least contact surface 36 associated with a free bridge end 37 of contact bridge 34 is connected by a solder connection to the corresponding current path end 31 of lead frame 28. The or each soldering site contacts current path ends 30 and 31 with one another electrically via contact bridge 34 and connects contact bridge 34 mechanically to the particular current path end 30, 31 of lead frame 28 to form a mechanically stable connection.

To realize the function of thermal fuse 24, a separate spring element 38 is provided in the form of a leg spring, which is held with a first spring leg 39 on an extension arm 40, formed from plastic encapsulation 29, and there in a rear undercut contour 42 in terms of pivot direction 41 of contact bridge 34. Second spring leg 43 abuts contact bridge 34 on its front side in terms of pivot direction 41 under spring bias. Spring legs 42, 43 of spring element 38 are situated at an acute angle to one another and are connected to one another via a spring or leg loop 45, forming a spring eye 44 and having a number of spring turns. Spring element 38 sits with said spring eye 44 on a pivot pin 46, which is formed advantageously also from plastic encapsulation 29 and forms rotation axis 47 for contact bridge 34.

Contact bridge 34 with its holding end 48, which faces away from free bridge end 37 and in which a bored hole (not visible) for receiving pivot pin 46 is introduced, is mounted so as to be rotatable about rotation axis 47 which is perpendicular to the plane in which interruption point 32 lies. Spring loop 45 of spring element 38 and thereby its spring eye 44 are arranged coaxially relative to pin 46 and therefore relative to rotation axis 47.

Contact bridge 34 is made in the manner of a stamped/bent part with a number of bent sections, which form a central, raised bridge section 34a. Second contact surface 35 of contact bridge 34, said surface being provided between rotation axis 47 at holding end 48 and interruption point 32, is situated on the underside of a bent depression 34b, said underside facing lead frame 28 and plastic encapsulation 29, and both middle bridge section 34a and holding end 48 of contact bridge 34 are raised relative to the depression. In contrast, both contact surfaces 35 and 36 of contact bridge 34 are located at the same height level based on the plane of interruption point 32. In this case, contact surface 36 associated with free bridge end 37 is situated underneath a bridge section 34c, which is lower relative to raised bridge section 34a.

The contact-bridge-side spring leg 43 of spring element 38, suitably made of round wire, is held by means of two extensions 49, 50, which are formed on contact bridge 34 and extend in the opposite direction to the drawn pivot direction 41. In this case, this spring leg 43 engages below extension 49, provided on the middle raised bridge section 34a, and engages above extension 50, provided on the free bridge end 37.

The circle segment-like guide slot 33 in the area of its circle radius, facing away from interruption point 32 in pivot direction 41, forms an abutment contour 51. This abutment or stop contour 51 serves as a stop for contact bridge 34 when thermal fuse 24 is triggered and therefore as an end stop for the pivoting movement of contact bridge 34 about rotation axis 47. Interruption point 32 is located accordingly in the area of the opposite or other circle radius or at least adjoins it.

A slot wall 52, following the circular arc of circle segment-like guide slot 33, is also formed from plastic encapsulation 29 and there delimits the partial area of a circular area, said partial area being formed by guide slot 33 and rotation axis 47 being in the center of the circular area. Within guide slot 33, arcuate slots 53, 54 are introduced in plastic encapsulation 29 and in the underlying lead frame 28. An arcuate guide contour 55 is formed on the inner side, facing rotation axis 47, of arcuate slot 54 from plastic encapsulation 29 within guide slot 33. It is located in the transitional region between the middle, raised bridge section 34a and bent depression 34b. Said guide contour 55 is used additionally for pivoting guidance or sliding guidance of contact bridge 34 when thermal fuse 24 is triggered.

In the event of triggering after melting of the solder of the soldering sites, contact bridge 34 and the bridge-side spring leg 43 of spring element 38 pivot about pin 46 and therefore about axis 47. Contact surface 35 of contact bridge 34 is in fact located in the vicinity of rotation axis 47, but is intentionally arranged spaced apart from it. Thermal fuse 24 is triggered in particular at an excessive temperature in that the solder melts and contact bridge 34 pivots due to the spring force of spring element 38 by a combined rotational and shearing movement, so that interruption point 32 bridged by the biased contact bridge 34 is interrupted. Contact bridge 34 in the case of triggering pivots from a first position (contact position) to a second position (triggering position), whereby the pivoting movement occurs about rotation axis 47 and in the plane of interruption point 32. In this case, the pivoting movement of contact bridge 34 in pivot direction 41 is limited by abutment contour 51 in that contact bridge 34 strikes it and advantageously furthermore is under spring bias by means of spring element 38. Contact bridge 34 and in particular spring element 38 in both positions (contact and triggering position) are held securely as a result. During the pivoting, contact spring 34 is securely guided within guide slot 33 also without a guide contour 55, because contact spring 34 with its contact surfaces 35, 36 can slide along the corresponding circle segment-like surface section (surface region) of plastic encapsulation 29.

The invention is not limited to the exemplary embodiments described above. Rather, other variants of the invention can also be derived herefrom by the skilled artisan, without going beyond the subject of the invention. Particularly, further all individual features described in relation to the individual exemplary embodiments can also be combined with one another in a different manner, without going beyond the subject of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric motor for driving a motor vehicle component, the electric motor comprising:
    an electronics unit that includes a lead frame, which is provided with plastic encapsulation and has a current path conducting the motor current; and
    two spaced-apart current path ends that form an interruption point bridged by a thermal fuse in the form of a spring-biased contact bridge,
    wherein the contact bridge is held so as to be pivotable about a rotation axis extending substantially perpendicular to a plane of the interruption point,
    wherein an abutment contour that limits a pivoting range of the contact bridge is provided against which the contact bridge pivots rotationally as a result of a restoring force of a spring element when the thermal fuse is triggered, and
    wherein the spring element is formed as a leg spring with the spring eye coaxially surrounding the rotation axis, and with a first spring leg held on a stop-side extension arm and with a second spring leg under lying spring bias against the contact bridge on a long bridge side of the contact bridge that faces away from the abutment contour.

2. The electric motor according to claim 1, wherein the contact bridge has a free bridge end and a holding end opposing the free bridge end, wherein, in an area of the free bridge end, a first contact surface is soldered to one of the current path ends and a soldered second contact surface is in contact with the other current path end.

3. The electric motor according to claim 1, wherein the contact bridge has a bent depression directed toward the contact surface facing the rotation axis.

4. The electric motor according to claim 1, wherein the motor vehicle component is a fan impeller for cooling a cooling water.

5. An electric motor for driving a motor vehicle component, the electric motor comprising:
    an electronics unit that includes a lead frame, which is provided with plastic encapsulation and has a current path conducting the motor current; and
    two spaced-apart current path ends that form an interruption point bridged by a thermal fuse in the form of a spring-biased contact bridge,
    wherein the contact bridge is held so as to be pivotable about a rotation axis extending substantially perpendicular to a plane of the interruption point,
    wherein an abutment contour that limits a pivoting range of the contact bridge is provided against which the contact bridge pivots rotationally as a result of a restoring force of a spring element when the thermal fuse is triggered, and
    wherein the abutment contour, acting as an end stop for the contact bridge when the thermal fuse is triggered, is formed from the plastic encapsulation.

6. An electric motor for driving a motor vehicle component, the electric motor comprising:
    an electronics unit that includes a lead frame, which is provided with plastic encapsulation and has a current path conducting the motor current; and
    two spaced-apart current path ends that form an interruption point bridged by a thermal fuse in the form of a spring-biased contact bridge,
    wherein the contact bridge is held so as to be pivotable about a rotation axis extending substantially perpendicular to a plane of the interruption point,
    wherein the contact bridge is arranged and/or guided in a circle segment-like guide slot formed from the plastic encapsulation, which limits a pivoting range of the contact bridge at at least one of a circle radii and/or guides the contact bridge along an arcuate slot wall.

7. The electric motor according to claim 6, wherein the interruption point is arranged along one of the circle radii and an abutment contour in an area of the other circle radius of the circle segment-like guide slot.

8. An electric motor for driving a motor vehicle component, the electric motor comprising:
    an electronics unit that includes a lead frame, which is provided with plastic encapsulation and has a current path conducting the motor current; and
    two spaced-apart current path ends that form an interruption point bridged by a thermal fuse in the form of a spring-biased contact bridge,
    wherein the contact bridge is held so as to be pivotable about a rotation axis extending substantially perpendicular to a plane of the interruption point,
    wherein the contact bridge has a free bridge end and a holding end opposing the free bridge end, wherein, in an area of the free bridge end, a first contact surface is soldered to one of the current path ends and a soldered second contact surface is in contact with the other current path end, and
    wherein the second contact surface of the contact bridge is provided between the first contact surface and the rotation axis on a side facing the interruption point.

9. An electric motor for driving a motor vehicle component, the electric motor comprising:
    an electronics unit that includes a lead frame, which is provided with plastic encapsulation and has a current path conducting the motor current; and
    two spaced-apart current path ends that form an interruption point bridged by a thermal fuse in the form of a spring-biased contact bridge,
    wherein the contact bridge is held so as to be pivotable about a rotation axis extending substantially perpendicular to a plane of the interruption point,
    wherein the contact bridge has a free bridge end and a holding end opposing the free bridge end, wherein the holding end of the contact bridge sits on a pivot pin formed from the plastic encapsulation, the pivot pin forming the rotation axis.

10. An electric motor for driving a motor vehicle component, the electric motor comprising:
    an electronics unit that includes a lead frame, which is provided with plastic encapsulation and has a current path conducting the motor current; and two spaced-apart current path ends that form an interruption point bridged by a thermal fuse in the form of a spring-biased contact bridge, wherein the contact bridge is held so as to be pivotable about a rotation axis extending substantially perpendicular to a plane of the interruption point, wherein the contact bridge has a free bridge end and a holding end opposing the free bridge end, wherein, in an area of the free bridge end, a first contact surface is soldered to one of the current path ends and a soldered second contact surface is in contact with the other current path end, and wherein the contact bridge is a stamped/bent part with a number of bent sections, which form a raised bridge section in an area of the rotation axis between the first and second contact surfaces and in an area of an arcuate slot wall of a guide slot formed from the plastic encapsulation.

* * * * *